(12) United States Patent
Takebayashi et al.

(10) Patent No.: US 6,792,346 B2
(45) Date of Patent: Sep. 14, 2004

(54) DIAGNOSTIC APPARATUS FOR AN ENGINE

(75) Inventors: Hiroyuki Takebayashi, Aki-gun (JP); Hirohide Abe, Aki-gun (JP); Kouichi Terada, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/393,355

(22) Filed: Mar. 21, 2003

(65) Prior Publication Data

US 2003/0212484 A1 Nov. 13, 2003

(30) Foreign Application Priority Data

Mar. 29, 2002 (JP) .................................... 2002-096804
Dec. 16, 2002 (JP) .................................... 2002-363793

(51) Int. Cl.$^7$ .............................................. F02D 45/00

(52) U.S. Cl. ...................... 701/113; 701/114; 701/115; 60/274

(58) Field of Search ................................ 701/113, 102, 701/114, 115; 73/117.3; 60/274, 277, 276, 285

(56) References Cited

U.S. PATENT DOCUMENTS

| | | | |
|---|---|---|---|
| 5,632,250 A | | 5/1997 | Kato et al. |
| 5,845,486 A | * | 12/1998 | Yamashita et al. ............. 60/274 |
| 6,202,406 B1 | * | 3/2001 | Griffin et al. .................. 60/274 |
| 6,505,464 B1 | * | 1/2003 | Isobe et al. .................... 60/277 |
| 6,568,175 B2 | * | 5/2003 | Izumiura et al. ............... 60/284 |

FOREIGN PATENT DOCUMENTS

JP          08-93564         4/1996

* cited by examiner

*Primary Examiner*—Hieu T. Vo
(74) *Attorney, Agent, or Firm*—Nixon Peabody LLP; Donald R. Studebaker

(57) ABSTRACT

A cold-state emission-reducing strategy wherein a diagnostic apparatus examines for possible malfunctions of a control unit during cold start. The diagnosis judges that the strategy is faulty if the cumulative amount of fuel injection is equal to or smaller than a predeterminable threshold value for a faulty judgement. Thus, the abnormality of the cold-state emission-reducing strategy is accurately and easily detected, by merely calculating the cumulative amount of an injection pulse width for the injector or the cumulative amount of fuel flow during a predeterminable cumulating time period after engine start, and comparing the calculated cumulative amount with the predeterminable judgement threshold.

7 Claims, 3 Drawing Sheets

DIAGNOSTIC APPARATUS FOR AN ENGINE

BACKGROUND OF THE INVENTION

1. Field of the Invention

The present invention relates to a diagnostic apparatus for an engine, and more particularly to a diagnostic apparatus for examining for possible malfunction in a control to reduce emissions during an engine cold state.

2. Description of the Related Art

Exhaust gas discharged from an automotive engine includes pollutants, such as NOx (nitrogen oxides), CO (carbon monoxide), and HC (hydrocarbon). In order to purify these pollutants, the engine is generally equipped with a catalyst converter including an exhaust-gas purification catalyst such as a three-way catalyst and a NOx absorbing catalyst disposed in the engine exhaust-gas passage. The exhaust-gas purification catalyst, however, provides insufficient purification of the exhaust-gas until the activation temperature has been reached. To cope with this, during engine cold start when the exhaust-gas purification catalyst is still inactive, it is necessary that the temperature of the exhaust-gas purification catalyst be quickly raised, i.e., or the catalyst should be quickly warmed.

Thus, the general automotive engine, during engine cold start, implements a strategy for reducing emission in a cold state, (a logic for reducing emission in a cold state), which corrects a plurality of control parameters for the engine, such as an ignition timing, engine rotational speed (corresponding to the amount of intake-air), or air-fuel ratio (corresponding to the amount of fuel supply) to promote the activation or light-off of the exhaust-gas purification catalyst for enhancing its emission performance. The cold-state emission-reducing strategy is carried out by use of a mechanism, referred to as "a cold-state emission-reducing mechanism", comprising sensors including a coolant temperature sensor, controllable devices including an ignition coil and fuel injector, a control unit for controlling these devices, and other devices. By way of example, a target rotational speed and a target ignition timing (or the amount of ignition retard) of the engine may be set based upon a coolant temperature detected by the coolant temperature sensor in cold start, and then the fuel injector and the ignition coil may be controlled so as to achieve the rotational speed and the ignition timing.

However, in some cases, a malfunction may possibly occur in the sensors, controllable devices, and control unit installed in the engine. Such malfunction will prevent a normal implementation of the cold-state emission-reducing strategy, which impairs the emission performance during engine cold start. In order to detect such a malfunction during the cold-state emission-reducing strategy, an approach has been known which monitors each of the parameters associated with an implementation of the cold-state emission-reducing strategy, such as the amount of fuel injection, ignition timing, and engine rotational speed, as disclosed in Japanese Unexamined Patent Publication No. H08-093564 (U.S. Pat. No. 5,632,250). However, in the case of the respective monitoring of each parameter as above, the eventual deterioration level in emission performance is difficult to recognize. Moreover, the approach inevitably requires the monitoring of a variety of parameters and a complicated calculation of these parameters, which significantly complicates the diagnostic mechanism.

SUMMARY OF THE INVENTION

With regard to malfunction detection, the present invention identifies a correlation between the eventual deterioration level in emission performance and the cumulative amount of fuel injection from engine start.

In view of the problem above, an object of the present invention is to provide a simple and easy approach to diagnosis of the cold-state emission-reducing strategy which corrects a plurality of engine control parameters to promote the activation or light-off of the exhaust-gas purification catalyst for enhancing emission performance using the correlation identified by the present invention.

According to the present invention there is provided a diagnostic apparatus for an engine comprising: a catalyst temperature detecting device; a catalyst warming device; a cumulative fuel consumption calculating device; and a failure judging device. The catalyst temperature detecting device detects a value associated with the temperature of an exhaust-gas purification catalyst disposed in an exhaust system of the engine. The catalyst warming device corrects a plurality of control parameters for the engine so as to activate the exhaust-gas purification catalyst, when the exhaust-gas purification catalyst is determined to be inactivated based on the detection of the catalyst temperature detecting device. The cumulative fuel consumption calculating device calculates a value associated with the cumulative fuel consumption during a time period after engine start until the elapse of a cumulating period. The failure judging device judges that the catalyst warming device is faulty, when the cumulative fuel consumption is judged to be equal to or less than a judgement threshold based on the calculation of the cumulative fuel consumption calculating device.

The diagnostic apparatus for an engine monitors the cumulative fuel consumption during the period after engine start until the exhaust-gas purification catalyst is activated and determines that the cold-state emission-reducing strategy is faulty if the cumulative fuel consumption is equal to or less than the determination threshold.

Accordingly, the abnormality of the cold-state emission-reducing strategy is accurately and easily detected by merely calculating the cumulative amount of the fuel consumption determined from the cumulative amount of the injection pulse width for the injector (or fuel injection valve) or the cumulative amount of the fuel flow during a cumulating period after engine start, and comparing the calculated cumulative amount with the judgement threshold without monitoring a variety of control parameters for the cold-state emission-reducing strategy.

Preferably, the failure judging device makes a judgement of a faulty condition only during the idling of the engine, because little fluctuation in fuel consumption during idling improves the accuracy of the diagnosis.

In the above diagnostic apparatus, if the catalyst warming device sets a target engine rotational speed and a target ignition timing on the basis of a predetermined characteristic in accordance with an engine coolant temperature during engine start, and adjusts the amount of fuel injection and the ignition timing so as to achieve the target rotational speed and the target ignition timing, the judgement threshold may be preferably set based on the engine coolant temperature at engine start. Alternatively, the judgement threshold may be determined (or estimated) based on a target rotational speed and a target ignition timing, while the cumulating period is fixed to a constant value.

Additionally, in the diagnostic apparatus of the present invention, the cumulative period may be shorter for a lower engine coolant temperature at engine start, while the judgement threshold is fixed to a constant value, rather than correcting the judgement threshold in accordance with the engine coolant temperature as described above.

Other features, aspects, and advantages of the present invention will become apparent from the following description of the invention which refer to the accompanying drawings.

DETAILED DESCRIPTION OF THE INVENTION

Figure 1:
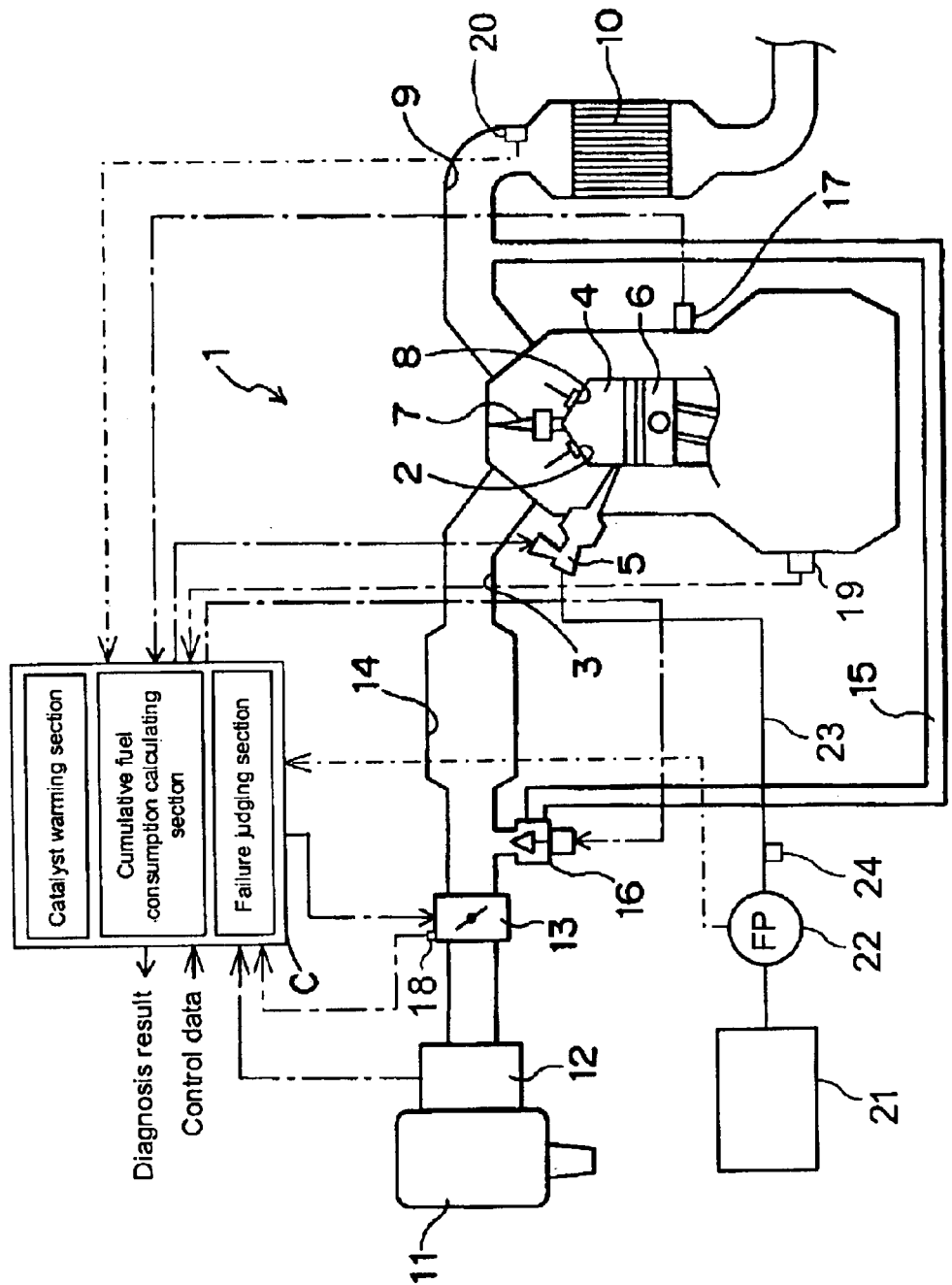
FIG. 1 is a schematic diagram of an engine according to the present invention in which diagnosis of the cold-state emission-reducing strategy is performed.

FIG. 1 shows an engine 1 in accordance with a preferred embodiment the present invention. As shown in FIG. 1, engine 1 introduces air for combustion into a combustion chamber 4 through an intake-air passage 3 while an intake valve 2 is open. Into the air in the combustion chamber 4, an injector 5 (or fuel injection valve) injects fuel, (e.g. gasoline), at predetermined timings so as to form an air-fuel mixture.

This mixture is compressed by a piston 6, and ignited by an ignition spark plug 7 at a predetermined timing to combust. The ignition timing of the ignition plug 7 can be retarded or advanced in an adjustable manner. The combusted gas or exhaust gas is discharged into an exhaust-gas passage 9 while an exhaust valve 8 is open.

In addition, a main body of the engine is provided with a coolant temperature sensor 17 for detecting the temperature of the engine coolant, and an engine rotational speed sensor 19 for detecting the engine rotational speed.

A catalyst converter 10 which operates as an exhaust-gas purification catalyst is disposed in the exhaust gas passage 9. Catalyst converter 10 includes a three-way catalyst capable of purifying CO, HC, and NOx. The exhaust-gas purification catalyst provides sufficient purification at a temperature equal to or higher than its activation temperature (e.g. 360 to 400° C.), but insufficient purification occurs at temperature lower than the activation temperature.

Also disposed in the exhaust-gas passage 9, is an exhaust-gas temperature sensor 20 which is provided on the upstream side of the catalyst converter 10 with respect to the airflow direction. The exhaust-gas temperature sensor 20 acts as a catalyst temperature detecting means, which detects a value associated with the temperature of the exhaust-gas purification catalyst 10 disposed in exhaust-gas passage 9 as the exhaust system of the engine 1.

From the upstream side to the downstream with respect to airflow, there is disposed in intake-air passage 3, an air filter 11 for removing dust and other particles from the intake air, an airflow sensor 12 for detecting the amount of the airflow, a throttle valve 13 for regulating the airflow by being opened and closed in response to the operation of an acceleration pedal (not shown), and a surge tank 14 for evening out the airflow.

An exhaust gas recirculation (EGR) passage 15 is provided for exhaust gas recirculation, or for returning a portion of exhaust gas from the exhaust-gas passage 9 to the intake-air passage 3. In the EGR passage 15, an EGR valve 16 is provided for regulating the amount of EGR gas. The injector 5 is supplied with fuel, drawn from the inside of a fuel tank 21 and pressurized, via a fuel supply passage 23. In the fuel supply passage 23, a fuel flow meter 24 is provided for measuring the flow amount of the fuel supplied to the injector 5.

The engine 1 of the above construction is provided with a control unit C for control thereof. The control unit C is an overall control apparatus for the engine, and includes a computer. The control unit C uses the amount of intake air detected by the airflow sensor 12, the engine coolant temperature detected by the coolant temperature sensor 17, the opening of the throttle detected by a throttle opening sensor 18 or an idle switch (a switch which turns on in response to full-close of the acceleration pedal (not shown)), the engine rotational speed detected by the engine rotational speed sensor 19, the exhaust-gas temperature detected by the exhaust-gas temperature sensor 20, the flow amount of the fuel supplied to the injector 5, measured by the fuel flow meter 24, and other control data, to perform a variety of engine controls such as fuel injection control, ignition timing control, and diagnosis of the cold-state emission-reducing strategy as will be described further herein.

The control unit C include a control circuit (not shown), which executes the correction, calculation, and determination processes, or other processes for performing the diagnosis of the cold-state emission-reducing strategy or other controls.

The engine 1 when in cold start, implements a cold-state emission-reducing strategy which corrects control parameters for the engine including at least one of the ignition timing, the amount of intake air, and the amount of fuel supply, to promote the activation and light-off of the exhaust-gas purification catalyst for enhancing emission performance. The cold-state emission-reducing strategy is carried out by the adjustment of the ignition timing, the amount of fuel injection, the amount of intake air, air-fuel ratio, engine rotational speed, and other parameters, the adjustment being executed by the control unit C based on the amount of intake air, engine coolant temperature, throttle opening, engine rotational speed, exhaust-gas temperature, amount of fuel flow, and other parameters.

In other words, the control unit C raises the exhaust-gas temperature to promote the activation or light-off of the exhaust-gas purification catalyst when fulfilling the predetermined condition for implementing the cold-state emission-reducing strategy. Particularly, in this embodiment, for example, the exhaust-gas temperature is raised by retarding the ignition to a timing of the target ignition timing set based on the engine coolant temperature detected by the coolant temperature sensor 17. The exhaust-gas temperature is also raised by setting a target fuel injection amount which provides the target ignition timing, the target engine rotational speed (a rotational speed higher than an idling rotational speed), and an air-fuel ratio (lean air-fuel ratio) set based on the engine coolant temperature and controlling the fuel injector 5 to achieve the target parameters, or by performing other controls. That is, the control unit C functionally includes a catalyst warming section which corrects a plurality of control parameters for the engine 1 so as to activate the exhaust-gas purification catalyst 10.

It should be understood that the term "cold start" used herein refers to when the engine 1 (or the catalyst such as the three-way catalyst or a NOx absorbing catalyst) starts in an unheated state at normal temperature, including a cold state.

The control unit C executes a variety of engine controls as described above, and implements the diagnosis of the cold-state emission-reducing strategy. The control unit C further includes a cumulative fuel consumption calculating section; and a failure judging section, as will be described further herein with reference to the flow charts shown in FIGS. 2 and 3. The following description relates to the diagnosis of the cold-state emission-reducing strategy according to the present invention. The other controls of the engine 1 operated by the control unit C are not described herein, because they are well-known conventional controls and not significant to the present invention.

Figure 2:
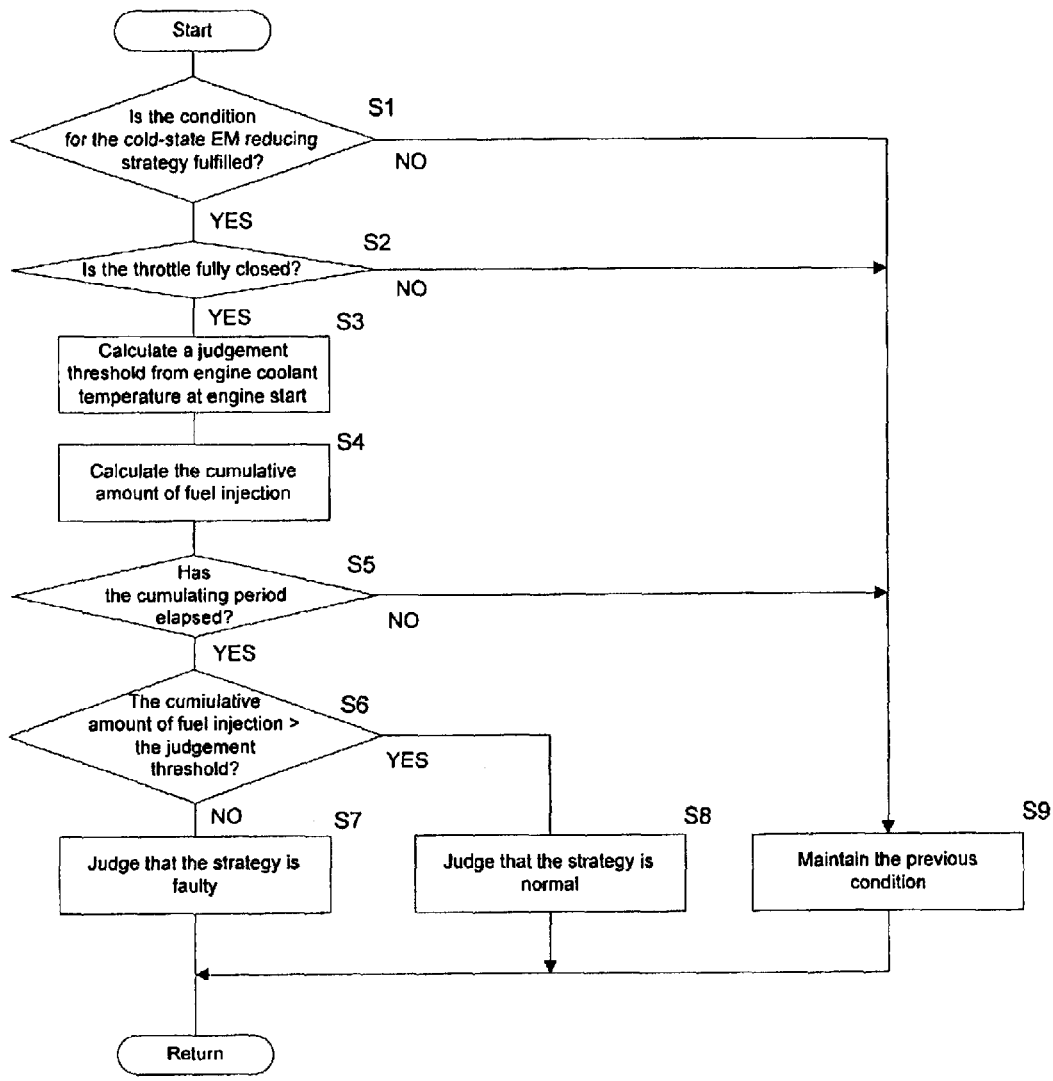
FIG. 2 is a flow chart illustrating the routine of the diagnosis of the cold-state emission-reducing strategy in the engine of FIG. 1.

FIG. 2 shows a control routine of the diagnosis of the cold-state emission-reducing strategy. Firstly, at step S1, a judgement is made as to whether the condition for the implementation of the cold-state emission-reducing strategy (within 60 seconds after cold start, and/or at a lower temperature of the engine coolant than a predetermined value) is fulfilled at engine start. If the condition is not fulfilled, that is, NO is judged at step S1, the diagnosis of the cold-state emission-reducing strategy is not allowed to start. Then, at step S9, the previous condition is maintained, and the routine returns to step S1.

If the condition is fulfilled, (that is, YES is judged at step S1, a judgement is made as to whether the throttle valve 13 is fully closed at step S2. If the throttle valve 13 is not fully closed, that is, NO is judged at step S2, the diagnosis is not performed because of possible inaccurate diagnosis of the cold-state emission-reducing strategy due to large fluctuation in fuel consumption. Then, at step S9, the previous condition is maintained, and the routine returns to step S1.

If the step S1 judges that condition for the implementation of the cold-state emission-reducing strategy is fulfilled, that is, YES is judged, and if the step S2 judges that the throttle valve 13 is fully closed, that is, YES is judged, the diagnosis of the cold-state emission-reducing strategy is implemented from steps S3 through S8.

In the diagnosis, firstly at step S3, a threshold for a failure judgement is calculated based on the engine coolant temperature at engine start. This is because, as described above, the target rotational speed of the engine and the target ignition timing of ignition timing are predetermined depending on the engine coolant temperature. Particularly, the target rotational speed and the target ignition time for promoting the light-off of the catalyst are determined by experimentation, depending on the engine coolant temperature. The characteristics are stored in the controller. Therefore, the accurate malfunction determination requires that the determination threshold should be changed depending on the engine coolant temperature in the case where the cumulating period, as described further herein, is fixed to a constant value for implementing the malfunction determination in a fixed time period. Alternatively, for a similar reason, the threshold may be calculated based on a target rotational speed and a target ignition timing.

Then, at step S4, the cumulative amount of fuel injection is calculated. Particularly, the calculation of the cumulative amount is made based on the cumulative amount of pulse width for injection on which the fuel injector 5 operates, or based on the cumulative amount of fuel flow calculated from the detection of the fuel flow meter 24 disposed in the fuel supply passage 23 communicating with the injector 5.

Alternatively, the cumulative amount of the fuel injection may be calculated (extrapolated) based on its gradient (rate of change) at step S4. This significantly shortens the time required for the calculation of the cumulative amount bf fuel injection.

Then, at step S5, a judgement is made as to whether the cumulating period has elapsed since engine start. The cumulating period refers to a predeterminable fixed time period, during which the amount of the fuel injection is cumulated. If the cumulating period has not elapsed, that is, NO is judged, the previous condition is maintained at step S9, to continuously cumulate-the amount of the fuel injection, and then the routine returns to step S1.

If step S5 judges that the cumulating period has elapsed, that is, YES is judged, step S6 judges if the cumulative amount of the fuel injection is larger than the judgement threshold calculated at step S3 as described above. If the cumulative amount of the fuel injection is smaller than the judgment threshold, that is, NO is judged, step S7 judges that the cold-state emission-reducing strategy is abnormal (or faulty). If the cumulative amount of the fuel injection is equal to or larger than the judgement threshold, that is, YES is judged, step S8 judges that the cold-state emission-reducing strategy is normal. Step S7 and step S8 correspond to the failure judging section.

As described above, in accordance with the diagnosis of the cold-state emission-reducing strategy of the present invention, the abnormality of the cold-state emission-reducing strategy is accurately and easily detected by merely calculating the cumulative amount of the fuel consumption determined from the cumulative amount of the pulse width for the injector 5 or the cumulative amount of the fuel flow during the cumulating period after engine start, and comparing the calculated cumulative amount with the threshold for failure judgement, without monitoring each of control parameters for the cold-state emission-reducing strategy.

It should be noted that the although the preferred embodiment is described in relation to a direct injection engine, which directly injects fuel into the combustion chamber, the present invention can also be applied to other engines, such as a port injection engine.

Figure 3:
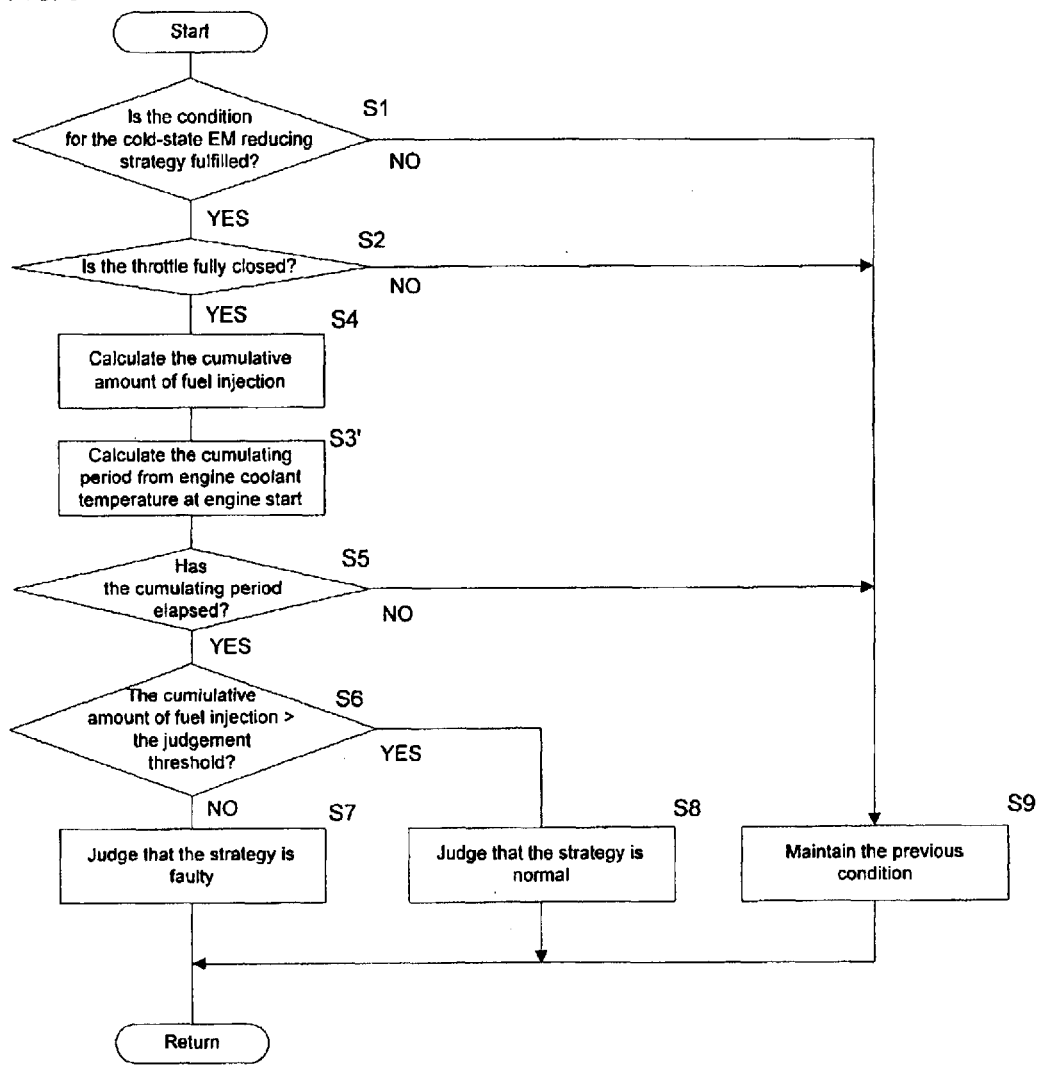
FIG. 3 is a flow chart showing another routine of the diagnosis of the cold-state emission-reducing strategy in the engine of FIG. 1.

Rather than setting the determination threshold from the engine coolant temperature and setting the determination threshold from the target rotational speed and target ignition timing as described above, setting the cumulating period for fuel injection from the engine coolant temperature achieves a simpler control logic with a fixed value of the determination threshold regardless of the engine coolant temperature. Particularly, the cumulating period may be shortened as the engine coolant temperature drops. FIG. 3 illustrates a flow chart showing a diagnostic process performed by the control unit C for this embodiment.

In the flow chart shown in FIG. 3, the same steps as those in the flow chart shown in FIG. 2 are identified with like step numbers as those in FIG. 2, thus the description of these same steps is omitted. The diagnostic process shown in FIG. 2 executes the step for calculating the determination threshold from the coolant temperature at engine start if the throttle is judged to be fully closed at step S2. In the diagnostic process shown in FIG. 3, however, the step for calculating the determination threshold is unnecessary because the threshold is fixed to a constant value. Thus, step S4 is executed immediately after step S2. Instead, after step S4, the cumulating period is calculated based on the coolant temperature at engine start, at step S3'. Step S3' features the shorter predeterminable time period in step S5 for the lower the engine coolant temperature at engine start. According to the control routine shown in FIG. 3, the determination threshold can be fixed to a constant value with a simpler control logic executed by the control unit C.

Although the present invention has been described in relation to particular embodiments thereof, many other variations and modifications and other uses will become apparent to those skilled in the art. It is preferred therefore, that the present invention be limited not by the specific disclosure herein, but only by the appended claims.

What is claimed is:

1. A diagnostic apparatus for an engine, comprising
   catalyst temperature detecting means for detecting a value associated with the temperature of an exhaust-gas purification catalyst disposed in an exhaust system of the engine;
   catalyst warming means for correcting a plurality of control parameters for the engine, so as to activate the exhaust-gas purification catalyst, when the exhaust-gas purification catalyst is determined to be inactivated based upon the detection of said catalyst temperature detecting means;
   cumulative fuel consumption calculating means for calculating a value associated with cumulative fuel consumption during a time period after engine start until the elapse of a cumulating time period; and
   failure judging means for judging whether said catalyst warming means is faulty, wherein a faulty condition occurs when the cumulative fuel consumption is judged to be equal to or less than a judgement threshold based on the calculation of said cumulative fuel consumption calculating means.

2. The diagnostic apparatus for an engine as defined in claim 1,
   wherein said failure judging means make a judgement of said faulty condition only during idling of the engine.

3. The diagnostic apparatus for an engine as defined in claim 1,
   wherein said catalyst warming means set a target engine rotational speed and a target ignition timing based upon a predetermined characteristic in accordance with an engine coolant temperature during engine start, and adjust the amount of fuel injection and the ignition timing so as to achieve the target rotational speed and the target ignition timing,
   wherein the judgement threshold is set based upon the engine coolant temperature at engine start.

4. The diagnostic apparatus for an engine as defined in claim 1,
   wherein said catalyst warming means set a target engine rotational speed and a target ignition timing based upon a predetermined characteristic in accordance with an engine coolant temperature during engine start, and adjust the amount of fuel injection and the ignition timing so as to achieve the target rotational speed and the target ignition timing,
   wherein the judgement threshold is determined based on the target engine rotational speed and the target ignition timing, while the cumulating time period is fixed to a constant value.

5. The diagnostic apparatus for an engine as defined in claim 1,
   wherein the cumulating time period is shorter for a lower engine coolant temperature at engine start, while the judgement threshold is fixed to a constant value.

6. A diagnostic apparatus for an engine, comprising: an exhaust-gas purification catalyst disposed in an exhaust-gas passage, a coolant temperature sensor which detects coolant temperature of the engine, a fuel injector which injects fuel so as to form an air-fuel mixture in a combustion chamber of the engine, a rotational speed sensor which detects rotational speed of the engine, a spark plug which communicates with the combustion chamber, and a controller which is electrically connected to the coolant temperature sensor and the rotational speed sensor to control the fuel injector and the spark plug,
   wherein the controller is programmed so as to
      calculate a target engine rotational speed and a target ignition timing based upon a predetermined characteristic in accordance with the detection of the coolant temperature sensor when the exhaust-gas purification catalyst is determined to be inactive based upon the detection of the coolant temperature sensor during engine start;
      transmit a signal for an operation of the fuel injector and the spark plug to achieve the target engine rotational speed and the target ignition timing;
      calculate a cumulative amount of fuel injection from engine start; and
      judge that the operation is faulty if the cumulative amount of fuel injection calculated until a constant time period elapses from engine start is equal to or smaller than a threshold value, the threshold value being determined based upon the target engine rotational speed and the target ignition timing.

7. A diagnostic apparatus for an engine, comprising: an exhaust-gas purification catalyst disposed in an exhaust-gas passage, a coolant temperature sensor which detects coolant temperature of the engine, a fuel injector which injects fuel so as to form an air-fuel mixture in a combustion chamber of the engine, a rotational speed sensor which detects rotational speed of the engine, a spark plug which communicates with the combustion chamber, and a controller which is electrically connected to the coolant temperature sensor and the rotational speed sensor to control the fuel injector and the spark plug,
   wherein the controller is programmed so as to
      calculate a target engine rotational speed and a target ignition timing based upon a predetermined characteristic in accordance with the detection of the coolant temperature sensor when the exhaust-gas purification catalyst is determined to be inactivated based upon the detection of the coolant temperature sensor during engine start;
      transmit a signal for an operation of the fuel injector and the spark plug to achieve the target engine rotational speed and the target ignition timing;
      calculate a cumulative amount of fuel injection from engine start; and
      judge that the operation is faulty if the cumulative amount of fuel injection calculated until a time period elapses from engine start is equal to or smaller than a constant threshold value, the time period being shorter for a lower coolant temperature detected by the coolant temperature sensor.

* * * * *